United States Patent
Hertz et al.

(10) Patent No.: US 8,675,454 B2
(45) Date of Patent: Mar. 18, 2014

(54) APPARATUS AND METHOD FOR SIGNAL PROCESSING

(75) Inventors: Timothy Jose Hertz, Berlin (DE); Egbert Juergens, Berlin (DE)

(73) Assignee: Native Instruments GmbH (DE)

( * ) Notice: Subject to any disclaimer, the term of this patent is extended or adjusted under 35 U.S.C. 154(b) by 624 days.

(21) Appl. No.: 12/971,169

(22) Filed: Dec. 17, 2010

(65) Prior Publication Data

US 2012/0158162 A1    Jun. 21, 2012

(51) Int. Cl.
*H04B 1/20* (2006.01)
*G06F 17/00* (2006.01)

(52) U.S. Cl.
USPC ............................ 369/9; 700/94; 84/612

(58) Field of Classification Search
USPC ......... 369/9, 69, 70, 30.27; 84/601, 602, 612; 700/94; 360/73.04, 31, 61
See application file for complete search history.

(56) References Cited

U.S. PATENT DOCUMENTS

| 4,300,225 A | 11/1981 | Lambl |
| 7,012,184 B2 | 3/2006 | Bastian |
| 7,273,980 B2 | 9/2007 | Wardle |
| 8,198,524 B2 * | 6/2012 | Bastian et al. .................. 84/601 |
| 8,217,252 B2 * | 7/2012 | Bastian .......................... 84/612 |

FOREIGN PATENT DOCUMENTS

| EP | 0871173 A2 | 10/1998 |
| WO | 97/01168 A1 | 1/1997 |
| WO | 01/65559 A1 | 9/2001 |

OTHER PUBLICATIONS

Hacker, The BeOS Bible, Peachpit Press, Audio Applications: Final Scratch, p. 751 (1999).
Bauer, Remixing Reality: The Role of New Interfaces and the Poltics of Techno-utopanism, Middlesex University, (1998).

* cited by examiner

*Primary Examiner* — Ali Neyzari
(74) *Attorney, Agent, or Firm* — Lerner, David, Littenberg, Krumholz & Mentlik, LLP

(57) ABSTRACT

Method and apparatus for signal processing for controlling a digital audio source may include retrieving a time code signal from a rotating recording medium. The time code signal may be a sum of a binary signal and a sinusoidal pilot signal in the audible range, and the binary signal has a symbol frequency less than a frequency of the pilot signal. The time code signal may be filtered to recover the pilot signal and the binary signal. An estimated speed of rotation of the recording medium may be determined from a recovered pilot signal, and an estimated position may be determined from a recovered binary signal, for controlling the digital audio source.

29 Claims, 9 Drawing Sheets

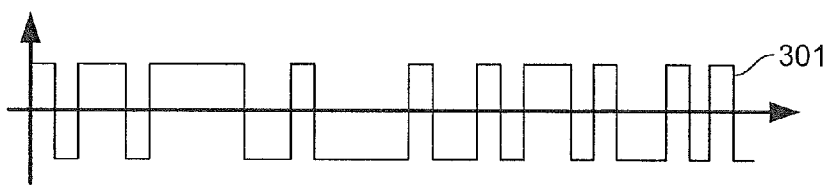
FIG. 3A
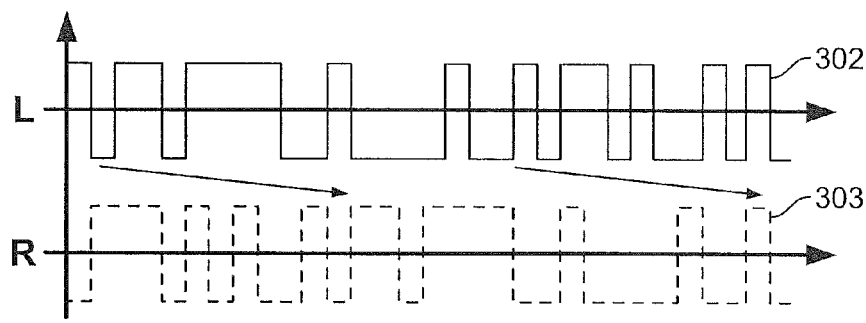
FIG. 3B L
FIG. 3C R
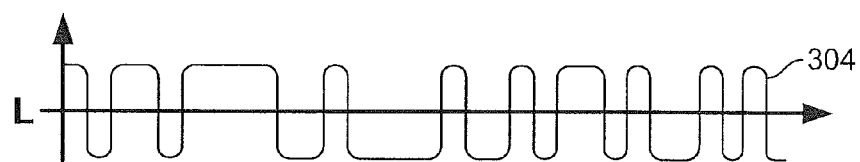
FIG. 3D L
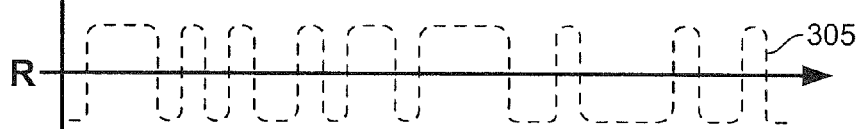
FIG. 3E R

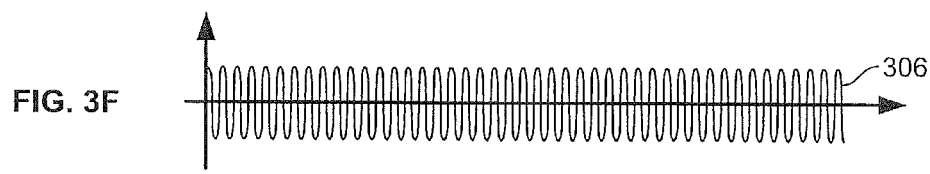
FIG. 3F
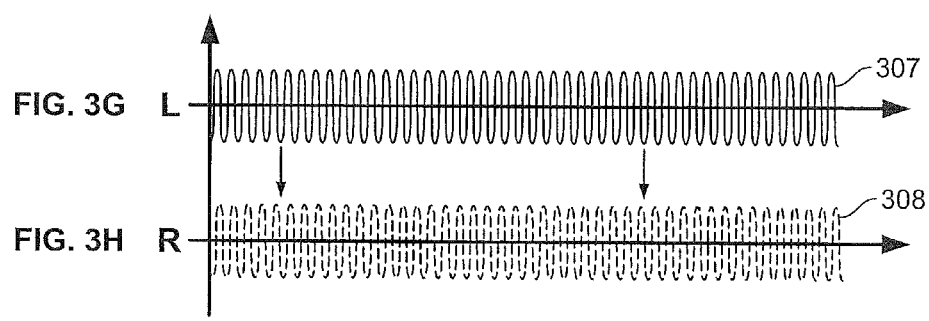
FIG. 3G L
FIG. 3H R
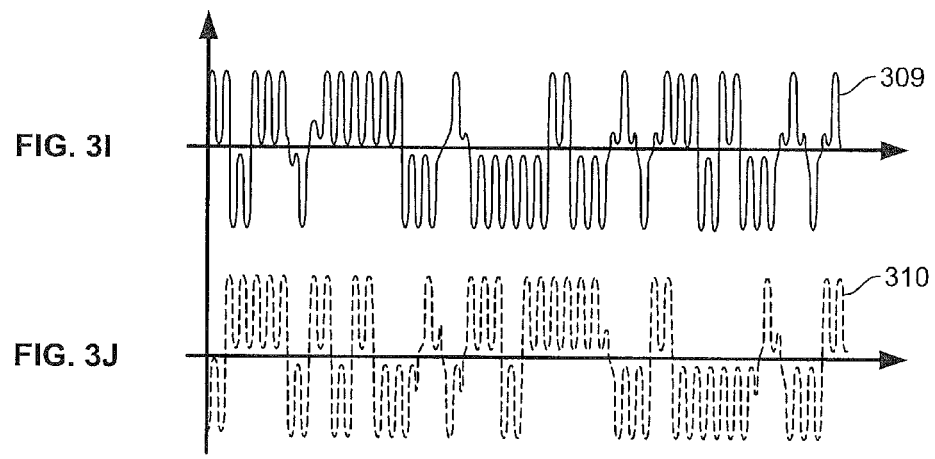
FIG. 3I
FIG. 3J

⇒ Speed Estimate

⇒ Position Estimate under the US 8,675,454 B2

APPARATUS AND METHOD FOR SIGNAL PROCESSING

BACKGROUND OF THE INVENTION

Aspects of the invention relate generally to signal processing. More particularly, aspects of the invention relate to apparatus and method for signal processing a time code signal recorded on a disc for controlling a digital audio source.

Disc jockeys are able to manipulate audio files stored on a computer, while retaining the manual feel of traditional records, using emulation systems known as a digital vinyl system ("DVS"). A DVS utilizes a special recording medium known as a time code record, which has a time code signal circumferentially recorded thereon in lieu of music. The time code signal may be used to direct playback of the audio file (e.g., MP3, .wav, etc.) such that the playback mimics the motion of the time code record. Thus, the audio file sounds as if a traditional vinyl record is being played.

Conventional DVS time code signals typically are binary signals modulated onto a carrier wave. An accurate frequency reading of the carrier wave is essential for estimating the speed of the recording medium. Therefore amplitude modulation ("AM") of the carrier wave is preferred over frequency modulation ("FM"). Phase locked loop ("PLL") circuits are used to detect the frequency of the carrier wave in the time code signal, which represents the speed of the recording medium. A demodulated binary signal obtained from the time code signal is used to determine a position on the recording medium.

An input signal of constant amplitude is optimal for detecting frequency using a PLL, because an output of the PLL fluctuates when the amplitude of the input signal fluctuates. Thus, when a carrier signal of changing amplitude, such as an AM signal where the modulation is from the binary signal, is the time code signal, heavy noise reduction or smoothing typically is required to accurately determine the frequency of the signal. For example, low pass filtering may be used to smooth the output signal of the PLL and remove high frequency noise. Such filtering, in essence, has the effect of calculating a weighted moving average of the output signal of the PLL over time, which introduces a latency between the input signal and the output signal. The more aggressive the smoothing, the more samples over which the moving average is taken, and therefore the greater the latency. It is desired to minimize latency in DVS, because a reduced latency minimizes the perceived delay between movement of the record and the audible response. To accurately emulate the manipulation of a traditional vinyl record, there should be a minimum or no latency in audible response following movement of the record.

Therefore, there exists a need for reducing the time in which and increasing the accuracy with which speed and position may be determined from a time code signal retrieved from a rotating recording medium.

BRIEF SUMMARY OF THE INVENTION

In accordance with an aspect of the invention, a method for signal processing for controlling a digital audio source may include retrieving a time code signal from a rotating recording medium, where the time code signal is a sum of a binary signal and a sinusoidal pilot signal having a frequency in the audible range. The binary signal has a symbol frequency less than the frequency of the pilot signal. The method may further include filtering the time code signal to recover the pilot signal and the binary signal; and providing estimated speed of rotation of the recording medium determined from a recovered pilot signal, and estimated position data determined from a recovered binary signal, for controlling the digital audio source.

In accordance with another aspect of the invention, an apparatus for signal processing may include a filtering unit to filter a time code signal retrieved from a rotating recording medium to recover a sinusoidal pilot signal and a binary signal summed in the time code signal. The pilot signal may have a frequency in the audible range and the binary signal may have a symbol frequency less than the frequency of the pilot signal. The apparatus may include an estimating unit to determine an estimated speed of rotation of the recording medium from a recovered pilot signal, and estimated position data from a recovered binary signal.

In accordance with an aspect of the invention, a disc-shaped recording medium may include a time code signal readable by an apparatus for signal processing. The time code signal may be recorded circumferentially on the recording medium, and generated by summing a binary signal and a sinusoidal pilot signal in the audible range. The binary signal may have a symbol frequency less than a frequency of the pilot signal.

In accordance with an aspect of the invention, a method for signal processing for controlling a digital audio source may include retrieving a time code signal from a rotating recording medium. The time code signal may include a stereophonic binary signal, and each channel of the stereophonic binary signal may represent a same binary code and independently identify an absolute position within the time code signal using a predetermined number N of consecutive bits. The method may further include estimating an absolute position within the time code signal using a predetermined number M of consecutive bits identified from each channel of the stereophonic binary signal, where M is less than the N.

BRIEF DESCRIPTION OF THE DRAWINGS

FIGS. 3A-3J show time domain representations of signals, in accordance with aspects of the invention.

DETAILED DESCRIPTION

The aspects, features and advantages of the present systems and methods will be appreciated when considered with reference to the following description and accompanying figures. The same reference numbers in different drawings may identify the same or similar elements. Furthermore, the following description does not limit the invention; rather, the scope of the invention is defined by the appended claims and equivalents.

In accordance with aspects of the invention, a time code signal may be a sum of a binary signal and a sinusoidal pilot signal. The time code signal may be circumferentially recorded on a recording medium by pressing or through the use of optical energy. The binary signal and the sinusoidal pilot signal may be used to indicate a position on and speed of, respectively, the recording medium. In desired embodiments, the pilot signal and the binary signal may be combined without modulation, such that the pilot signal and binary signal remain substantially intact in the time code signal. This permits a highly accurate determination of frequency from a pilot signal recovered from the time code requiring minimal smoothing, and thus faster determination of record speed and faster control of playback of an audio file and generation of sound associated with movement of a time code record.

Figure 1:
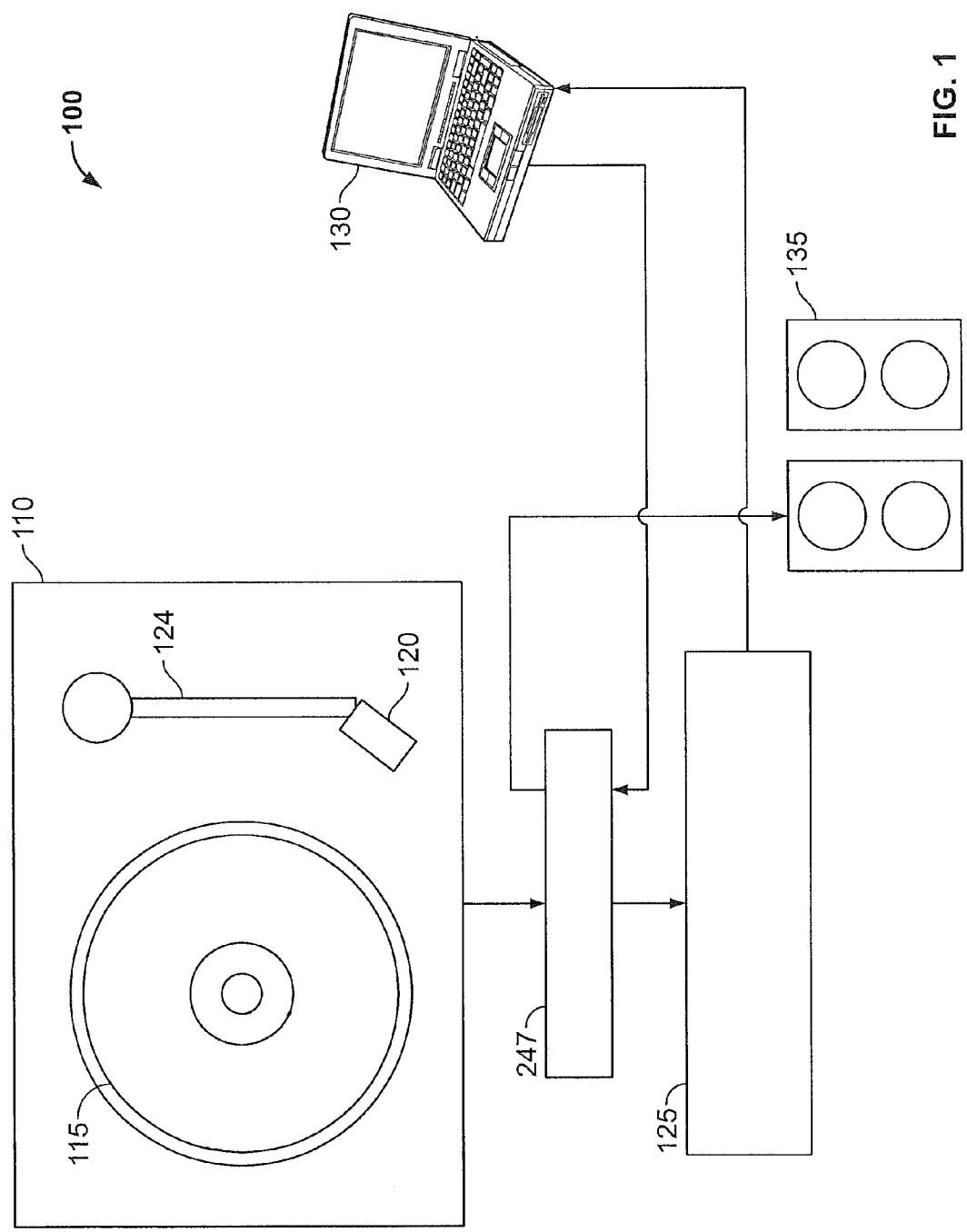
FIG. 1 is a high level illustration of a system, in accordance with aspects of the invention.
Figure 2:
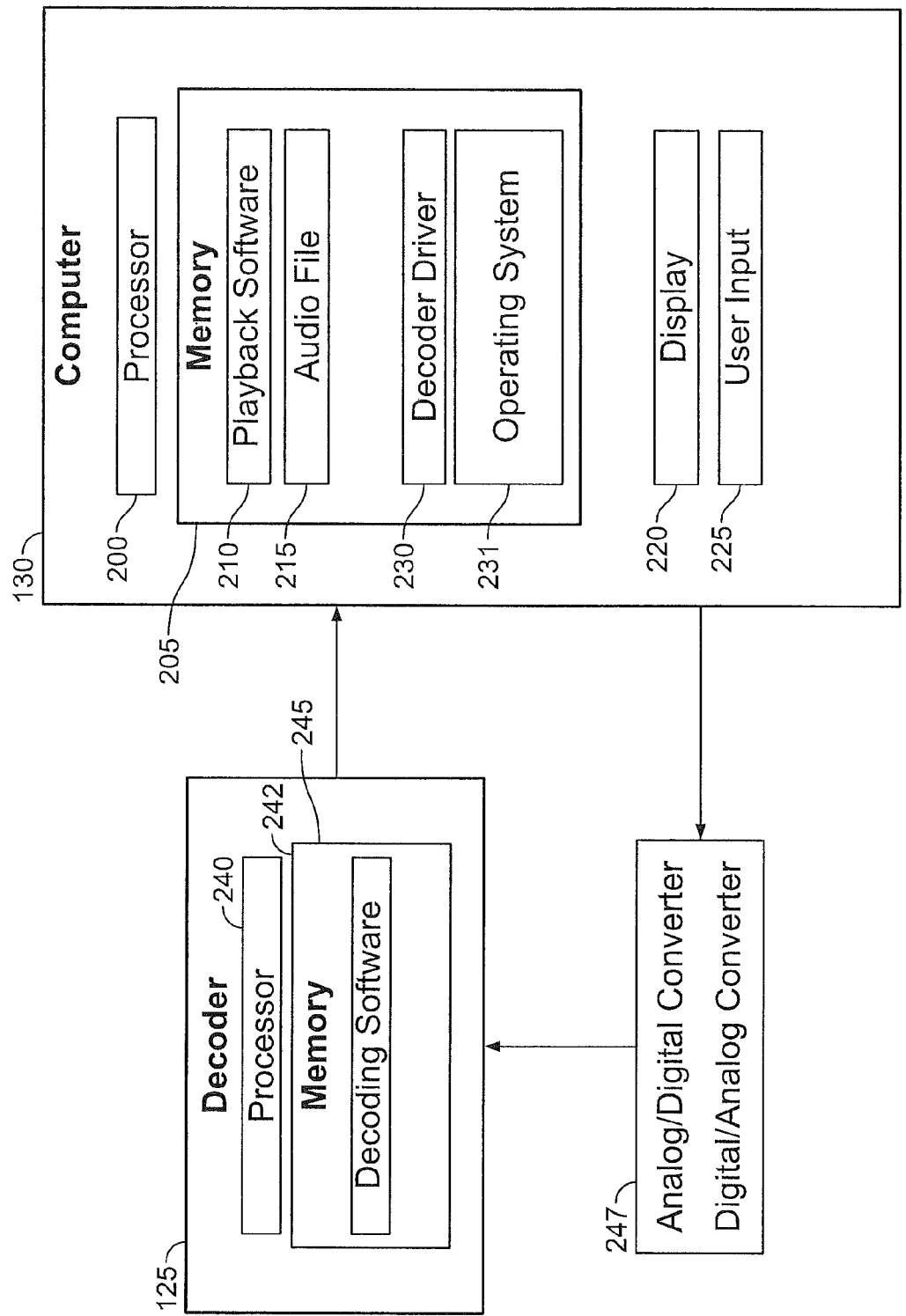
FIG. 2 is an illustration of a decoder, analog-to-digital/digital-to-analog converter and computer in communication with one another, in accordance with an aspect of the invention.

FIGS. 1-2 illustrate an embodiment of a system 100 in accordance with an aspect of the invention. The system 100 may include a conventional turn table 110 with a pick-up 120 at one end of a tone arm 124. Pick-up 120 may be adapted for detecting a time code signal recorded circumferentially in grooves on recording medium 115, such as a vinyl record, as it spins. As recording medium 115 spins, pick-up 120 may receive the vibrations and convert them into analog signals that may be carried along wires housed in tone arm 124. The analog signals may be forwarded to analog-to-digital/digital-to-analog converter 247, which converts the analog signals to digital signals and supplies the digital signals to decoder 125.

In an alternative embodiment, the recording medium 115 may be a digital recording medium, such as a compact disc (CD) including the time code signal recorded as a digital signal thereon. The pick-up may be an optical detector that detects the time code signal from the rotating CD and supplies an analog signal representative of the detected time code signal to the converter 127, which supplies a digital signal into which the analog signal is converted to decoder 125.

As explained in more detail below, the decoder 125 may include a high pass/low pass filter ("HPF/LPF") that filters the retrieved time code signal to recover the pilot signal and the binary signal, which desirably are summed in the time code signal. The frequency of the recovered pilot signal may be determined, and then used to determine the speed of the recording medium 115, and the recovered binary signal may be used to determine a position on the recording medium 115. Once determined, the speed and position may be communicated from the decoder 125 to computer 130. Computer 130 may then play the audio file 215 at the speed and based on the position determined by the decoder 125 via playback software 210 and the converter 247, which converts digital audio data of the audio file supplied by the computer 130 into analog audio signals which are supplied to the speakers 135. The sounds contained in the audio file may then be heard through speakers 135, which may include a scratch sound resulting from manipulation of the recording medium to move at a speed other than an ordinary speed of rotation of the medium 115 for playback of the audio file.

FIG. 2 shows the computer 130, the decoder 125 and the converter 247 in communication with each other, in accordance with an embodiment of the invention. The computer 130 may contain a processor 200, memory 205 and other components typically present in general purpose computers, such as a display 220 and user input 225. The memory 205 stores information accessible by processor 200, including playback software 210, audio file 215, decoder driver 230, and operating system 231 that may be executed or otherwise used by the processor 200. The memory 205 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems may include different combinations of the foregoing, whereby different portions of the instructions and data are stored on different types of media. Computer 130 may be a personal computer or a portable computer intended for use by a person and have all of the components normally used in connection with a personal computer (e.g., a monitor having a screen, a small LCD touch-screen, a projector, a television, a computer printer or any other electrical device that is operable to display information), user input 225 (e.g., a mouse, keyboard, touch-screen or microphone), speakers, a network interface device, and all of the components used for connecting these elements to one another.

The processor 200 may be any conventional processor, such as processors from Intel Corporation or Advanced Micro Devices. Alternatively, the processor may be a dedicated controller such as an ASIC. Although FIG. 1 functionally illustrates the processor 200 and memory 205 as being within the same block, it will be understood by those of ordinary skill in the art that the processor and memory may actually comprise multiple processors and memories that may or may not be stored within the same physical housing. For example, memory 205 may be a hard drive or other storage media. Accordingly, references to a processor or computer will be understood to include references to a collection of processors or computers or memories that may or may not operate in parallel.

Operating system 231 may be any suitable software capable of managing hardware devices and scheduling program execution. Any conventional operating system may be utilized (i.e., Linux, Mac OS X, Microsoft Windows, etc.).

In one embodiment, decoder 125 may be connected directly to computer 130 via any port that allows links to external peripherals (i.e., serial port, universal system bus port, etc.). Alternatively, decoder 125 may communicate with computer 130 over a network using any suitable protocol (i.e., intranets, virtual private networks, local Ethernet networks, private networks etc.).

The playback software 210 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Playback software 210 may communicate with decoder 125 via decoder driver 230. Decoder driver 230 may be any set of suitable instructions tailored to the hardware architecture of decoder 125 and to the operating system 231 of computer 130. The instructions of decoder driver 230 may instruct processor 200 to send or receive data from decoder 125 via a port on computer 130. Playback software 210 may invoke decoder driver 230 in order to receive playback speed and position data from decoder 125. The audio file 215 may be retrieved and manipulated by processor 200 in accordance with the speed and position parameters received by playback software 210 from decoder driver 230. The audio file 215 may be in any digital format (e.g., .MP3, .WAV, FLAC, AIFF, etc.). The audio file may be stored in computer registers, in a relational database, etc.

The decoder 125 may be a computer including a processor 240 and a memory 242, similar to the processor and memory of the computer 130. The decoder 125 may include decoding software 245, which includes instructions executable by the processor 240 for determining speed of rotation and position from a time code signal retrieved from a recording medium.

The converter 247 may be a hardware component that converts analog signals generated from retrieval of a time code signal from a recording medium into a digital time code signal, and converts digital audio data of an audio file supplied by the computer into analog audio signals.

In one embodiment, the computer 130 may include one or more of the instructions that the decoder 125 executes to perform signal processing in accordance with aspects of the invention. In a desired embodiment, the computer 130 and one or both of the decoder 125 and the converter 247 may constitute a single apparatus.

FIGS. 3A-H illustrate exemplary binary signals and pilot signals that may be used in the decoder 125 to generate a time code signal, and FIGS. 3I-3J illustrate exemplary time code signals that may be generated, in accordance with aspects of the present invention. Referring to FIGS. 3A-3E, binary signal 301 is an illustrative single channel binary signal including a binary code. The binary code includes a sequence of bits that form words each representing absolute time positions. Binary signals 302 and 303 are illustrative left channel and right channel binary signals, respectively, of a stereophonic binary signal. The binary code in each of the binary signals 302 and 303 is identical, and may have a bit or symbol frequency that is about 1 KHz, and a maximum of about 2.5 KHz.

In accordance with one aspect of the invention, the binary signal 303 may lag behind binary signal 302, such as by one-half of a word length or one-half of the consecutive number of bits that form a word. For example, the binary code may use a word length of 22 bits to indicate absolute position on the recording medium, and the binary code in the right channel may be delayed relative to the left channel by one-half of the word length. Consequently, the time to accumulate the number of bits required to determine an initial position on the recording medium at which a time code signal including a stereophonic binary signal is retrieved may be halved, because the 22 bit word can be retrieved by concatenating 11 bits from the left channel binary signal with the 11 delayed bits in the right channel binary signal.

In addition, the binary signals 302 and 303 may be band-limited, so as to have an upper frequency limit, by applying a low pass filter having a low pass cut off frequency, to obtain the binary signals 304 and 305. The low pass cut off frequency may be selected to preserve the shape of the binary signal while ensuring adequate attenuation of the binary signal relative to the pilot signal when a time code signal retrieved from a recording medium is processed to estimate position and speed. In one embodiment, the low pass cut off frequency may be about 2 KHz.

Referring to FIGS. 3F-3H, pilot signal 306 may be a single channel pilot signal in the audible range that may be sinusoidal and preferably has a substantially constant amplitude.

In one embodiment, pilot signals 307-308 may be respective left channel and right channel pilot signals of a stereophonic pilot signal, where the pilot signal 308 lags behind pilot signal 307 by ninety degrees.

The frequency of pilot signals 306-308 may be between approximately 2.5-5.6 KHz.

The binary signals 301-305 may have symbol frequencies that are less than the frequencies of the pilot signals 306-308. In one embodiment, the ratio of the frequency of the pilot signal to the frequency of the binary signal may be at least approximately 1.5:1.

Referring to FIGS. 3I and 3J, in one embodiment, a left side signal 309 of a stereophonic time code signal may be generated by summing binary signal 304 and pilot signal 307, and a right side signal 310 of the stereophonic time code signal may be generated by summing binary signal 305 and pilot signal 308.

Figure 8:
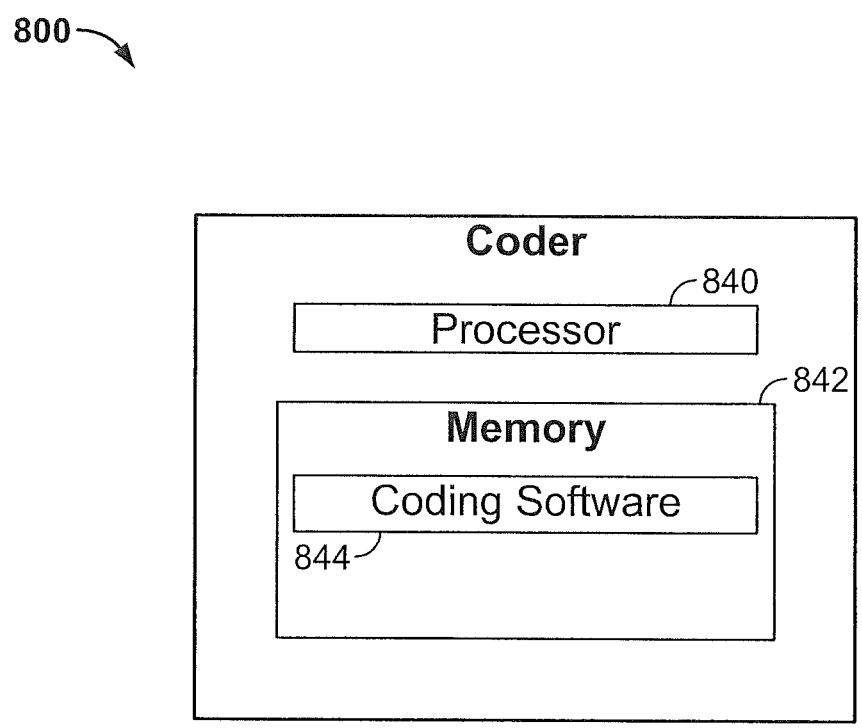
FIG. 8 is block diagram of a coder apparatus, in accordance with one embodiment of the invention.

Referring to FIG. 8, a coder apparatus 800 may generate a time code signal by summing a binary signal and a pilot signal, in accordance with aspects of the invention. The coder apparatus 800 may include a processor 840 and a memory 842 including time code signal coding software 844. The software 844 may include instructions executable by the processor 840 to sum a binary signal and a pilot signal to generate a time code signal, such as a single channel or stereophonic time code signal, and provide an output signal including the time code signal for recording on a recording medium, such as a conventional vinyl record or a CD. For example, the coder apparatus 800 may supply an output signal for recording the left side signal 309 and the right side signal 310 of a stereophonic time code signal circumferentially on a recording medium via pressing or optical energy. In an alternate embodiment, a non-stereophonic time code signal, such as one of the signals 309 and 310, may be circumferentially recorded on a recording medium.

Figure 4:
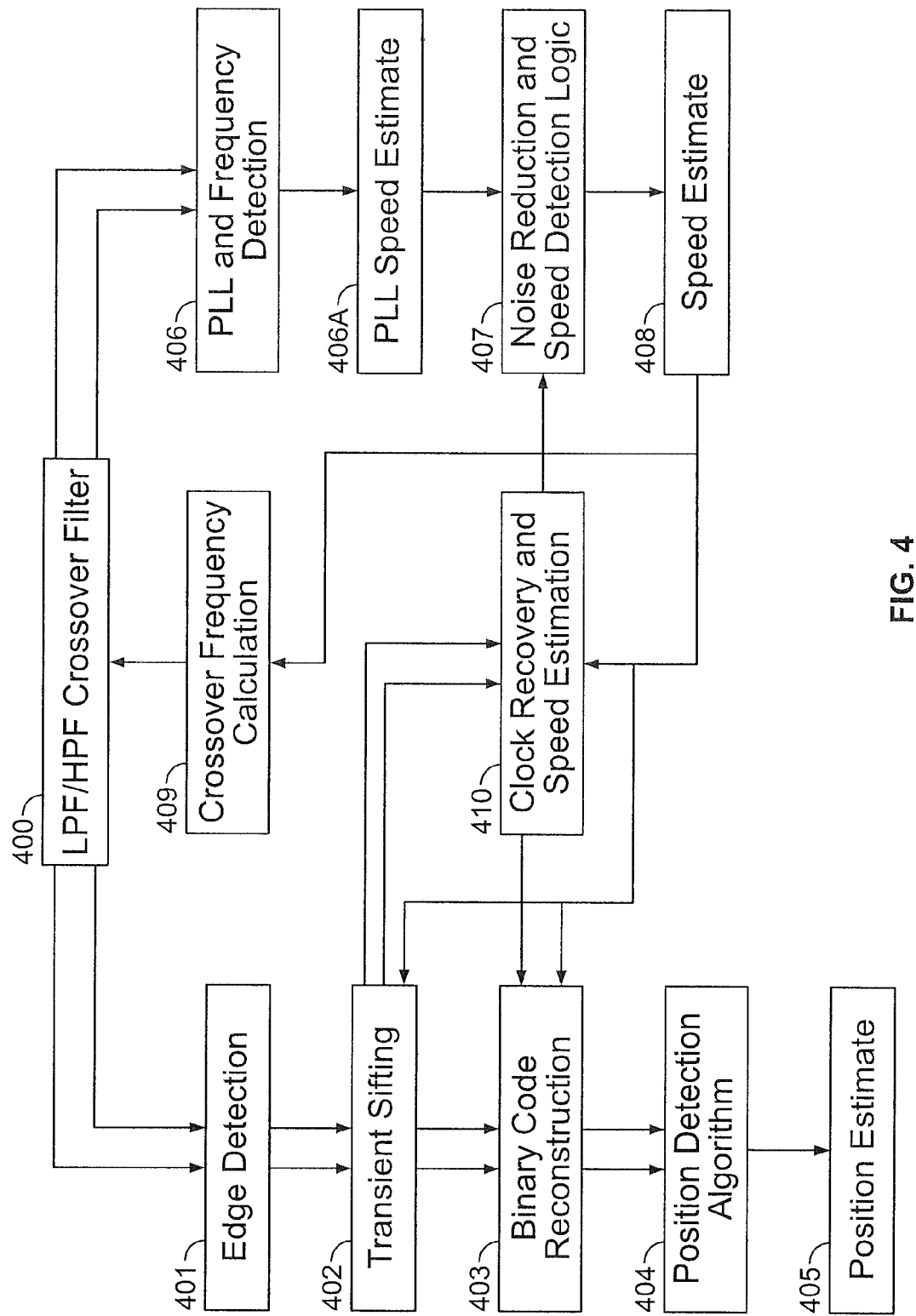
FIG. 4 is an illustrative architecture of a decoder, in accordance with aspects of the invention.

FIG. 4 is a schematic, flow diagram illustrating processing that may be performed at the decoder 125, upon receipt of a time code signal retrieved from a rotating recording medium, to estimate speed of the record and estimate position on the record. In one embodiment, a stereophonic time code signal, such as including the left channel and right channel signals 309 and 310, respectively, may be retrieved from a recording medium, such as a vinyl record, and then converted at the converter 247 to digital signals which are supplied to the decoder 125. The digital signals may then be supplied to crossover filter 400 of the decoder 125. The crossover filter 400 may be a digital filter containing any conventional high pass filter (HPF) and low pass filter (LPF). The filter 400 may high pass filter and low pass filter the retrieved left and right channels of the stereophonic time code signal to recover the pilot signals and the binary signals, respectively, such that the pilot signals are separated from the binary signals. In one embodiment, a second order Butterworth HPF and a fourth order Butterworth LPF may be utilized as the filter 400.

Advantageously, since the time code signal is preferably a sum of a binary signal and a pilot signal, the binary signal and the pilot signal may be recovered substantially intact from the time code signal. In other words, the pilot signal, which is separated in the frequency domain from the symbol frequency of the binary signal, and the binary signal, which is not modulated on the pilot signal, may be recovered in substantially their original form before they were summed to form the time code signal recorded on the recording medium.

In one embodiment, the crossover filter 400 may separate the binary signal from the pilot signal using low pass filtering and high pass filtering having respective cutoff frequencies that provide for a cross over frequency of the LPF and HPF that is approximately half-way between the frequency of the pilot signal and the symbol frequency of the binary signal. The cut off frequencies desirably may be set such that the pilot signal is sufficiently attenuated in relation to the binary signal in the low pass filtered signal, and the binary signal is sufficiently attenuated in relation to the pilot signal in the high pass filtered signal, so as to provide that the binary signal and the pilot signal, respectively, may be readily identified and separated for use in further processing. In one embodiment, the filtered pilot signal may be a substantially pure sine wave of constant amplitude.

In one embodiment, a cross over frequency calculation unit 409 may determine cut off frequencies for low pass and high pass filtering, according to a current final speed estimate 408, and forward the cut off frequencies to the filter 400. The cut off frequencies may be scaled proportionally to the speed of the recording medium. For example, a recording medium rotating at one-half normal speed reduces by one-half the pilot frequency and symbol frequency of the retrieved time code signal. In one embodiment, the cross over filter 400 may calculate a time-varying scale factor equal to the ratio between current speed estimate 408 and normal speed. In a further embodiment, the cut off frequency may be set to this scale factor multiplied by the nominal cut off frequency for normal speed playback.

The high pass filtered, stereophonic pilot signals may be forwarded from the filter 400 to a phase locked loop (PLL) unit 406. PLL unit 406 may determine the frequency of a pilot signal. The frequency of the pilot signal is indicative of the record speed. In addition, the PLL unit 406 may determine the direction of rotation of the record from a pilot signal. PLL unit 406 may be any conventional PLL implemented in software or as an integrated circuit using standard components.

The output of PLL unit 406, which may be the detected frequency of the pilot signal from the phase locked loop, may be forwarded to PLL speed estimate (PSE) unit 406A. The PSE unit 406A may determine a PLL speed estimate by dividing the frequency determined by the PLL unit 406 by a frequency equal to the frequency of a pilot signal used to generate the time code signal recorded on the recording medium.

The PLL speed estimate, and also speed estimates generated from the recovered binary signal ("binary speed estimates") at a clock recovery and speed estimation unit 410, as described in detail below, may be supplied to a noise reduction and speed detection ("NRSD") unit 407. NRSD unit 407 may determine a final speed estimate 408, based on PLL speed estimates and binary speed estimates. In one embodiment, the NSRD unit 407 may process the incoming speed estimates to discard values deemed erroneous, select the most appropriate source of measurements for the current operating conditions, and determine a speed estimate using information on the system's current and previous states. For example, at each time step, the NSRD unit 407 may discard binary speed estimates that differ more than some predetermined error threshold from a previous "master" speed estimate 408. Further, binary speed estimates may be ignored when the master speed estimate is below a predetermined threshold, as the binary speed estimates are very unreliable at low record speeds. Further, the PLL speed estimate may be ignored when the master speed estimate is above a predetermined threshold speed, because under these conditions the now very high frequency pilot signal may be unacceptably degraded by the poor high frequency response of the vinyl medium. Advantageously, the NSRD unit 407 may provide a final speed estimate 408 having greater reliability, when the speed estimates from the either the PSE unit 406A or the clock recovery unit 410 are known to be noisy or inaccurate.

In one embodiment, the NSRD unit 407 may further include a state estimator, such as a conventional Kalman filter, that receives multiple inputs of speed estimates, namely, the PLL speed estimates and the binary speed estimates, when available, and generates a rolling estimate of the system states, such as speed, using a combination of observed speed estimate values and intelligent prediction. Speed estimate 408 may be forwarded to decoder driver 230 of computer 130 to control the playback speed of audio file 215.

In one embodiment, as discussed above, the cross over frequency calculation unit 409 may receive the speed estimate 408 from which cut off frequencies may be determined. As will be explained below, the speed estimate 408 may also be used as a reference in reconstruction of a binary code from the filtered binary signal recovered from the retrieved pilot signal.

Figure 5A:
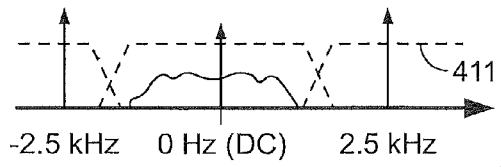
FIGS. 5A-5F show frequency and time domain representations of signals and information, in accordance with an aspect of the invention.
Figure 5B:
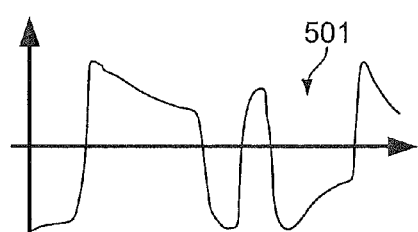
Figure 5C:
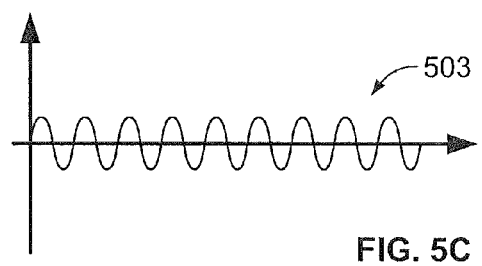
Figure 5D:
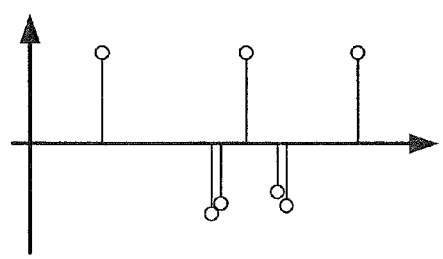

FIG. 5A illustrates, in the frequency domain, an exemplary time code signal 411 retrieved from the recording medium, and FIGS. 5B-5F illustrate signals and information obtained by processing in the decoder 125 of the time code signal 411. Recovered binary signal 501, as shown illustrated in the time domain in FIG. 5B, and recovered pilot signal 503, as shown illustrated in the time domain in FIG. 5C, may be obtained by filtering the retrieved time code signal 411 using the HPF/LPF 400. Referring also to FIG. 4, the recovered binary signal 501 may be forwarded to edge detector 401, which may operate to detect transients in the binary signal 501, as shown in FIG. 5D. Edge detector 401 may be implemented in software or as an integrated circuit using standard components.

After detecting the transients in the recovered binary signal 501, edge detector 401 may forward information indicating the detected transients to transient sifter 402.

Figure 5E:
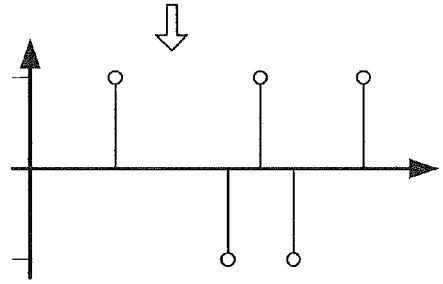

Transient sifter 402 may also be implemented as software or an integrated circuit using standard components. Transient sifter 402 may operate to remove (discard) erroneous transients detected by edge detector 401 to reliably determine binary transitions. In one embodiment, the sifter 402 may determine a length of a one bit period using speed estimate 408 as a reference, and therefore determine a maximum period of time between transients which are clustered close to each other such that the transients may be merged into one transition. The faster the speed estimate 408, the closer together the transients, such that transient sifter 402 may less aggressively merge or discard the transients. The output of transient sifter 402 may be a series of binary transitions (i.e., UP or DOWN), as shown in FIG. 5E. Information indicating these transitions may then be forwarded to binary code reconstruction ("BCR") unit 403.

The BCR unit 403 may operate to create a binary bit stream indicative of a position on the recording medium, based on the transitions. In one embodiment, N consecutive bits in the binary bit stream determined from a recovered binary signal may correspond to a word indicating an absolute position in the time code signal.

In another embodiment where the time code signal includes stereophonic binary signals, N/2 consecutive bits from each of the left channel and right channel binary signals may be concatenated to form an N bit word.

In a further embodiment, the N/2 consecutive bits may be obtained from respective stereophonic binary signals demodulated from a modulated carrier wave which is a time code signal retrieved from a recording medium.

Figure 5F:
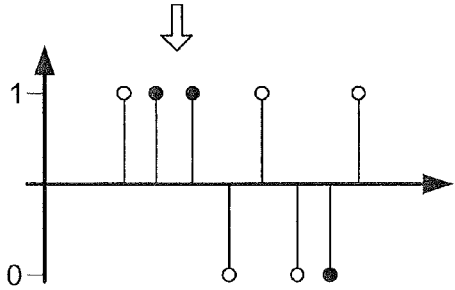

In one embodiment, the BCR unit 403 may utilize speed estimate 408 and information from clock recovery module 410 to determine the number of identical bits to insert into a bit stream, as shown in FIG. 5F in which inserted bits are shown in bold. For example, the faster the estimated speed, the more identical bits that may need to be consecutively inserted into the bit stream (e.g., 1111 or 0000) between transients.

In one embodiment, transient sifter 402 may forward its output to clock recovery unit 410. For each transient, clock recovery unit 410 may analyze the elapsed time since the last transient, and determine how many consecutive identical bits are represented by the elapsed time interval. The unit 410 may then provide such information to the BCR unit 403, and the BCR unit may use the information to determine how many consecutive identical bits to insert into the bit stream. The number of bits to be inserted in between transients is equal to one less than the determined number of consecutive bits in the elapsed time interval.

For example, the expected bit period (i.e., the amount of time representing one bit) may be compared to an elapsed time interval. If two transients are 6 msec apart, and the bit period is 1 msec, the BCR unit 403 may insert five consecutive identical bits between the transients. However, if the bit period is 2 msec, BCR unit 403 may insert two consecutive identical bits. The bit period may be 6 ms, such that no bits may be inserted. Thus, clock recovery unit 410 may provide updated bit periods for use by the BCR unit 403.

In one embodiment, clock recovery unit 410 may operate under the assumption that transients occur at integer multiples of the current bit period, and may operate to round the elapsed time to the nearest integer multiple of the current bit period. The elapsed time interval may be divided by the nearest multiple of the current bit period to derive a speed correction factor, which is then used to derive a new estimate of the speed which is the binary speed estimate. By way of example, if the elapsed time interval is 3.3 msec and the current bit period is 1 msec, the correction factor may be 3.3 msec/3 msec or 1.1, because 3 msec is the nearest multiple of the current bit period. Therefore, BCR unit 403, based on such information from the clock recovery unit 410, may correct the current bit factor by 1.1 and therefore insert a new bit every 1 msec multiplied by 1.1, or 1.1 msec.

In a desired embodiment, the symbol frequency of the original binary signal may be chosen so as to exceed expected fluctuations in the speed of the recording medium by at least a predetermined amount, such that a ratio of a new bit period to a prior bit period is very close to 1. By providing that a ratio of about 1 may be obtained, corrections may be small and incremental, thereby avoiding the determinations by the BCR unit 403 from becoming unstable.

The binary bit stream generated by BCR unit 403 may be forwarded to position detection unit 404, which may use the bit stream to generate a position estimate 405 indicative of a position on the recording medium.

In another embodiment where the time code signal includes stereophonic binary signals, N/2 consecutive bits from each of the left and right binary signal channels may be concatenated to form an N bit word. The N-bit word may correspond to a position on the recording medium at which the time code signal being processed initially was retrieved.

The position estimate 405 may be forwarded to decoder driver 230 which may communicate the position to playback software 210.

Figure 6:
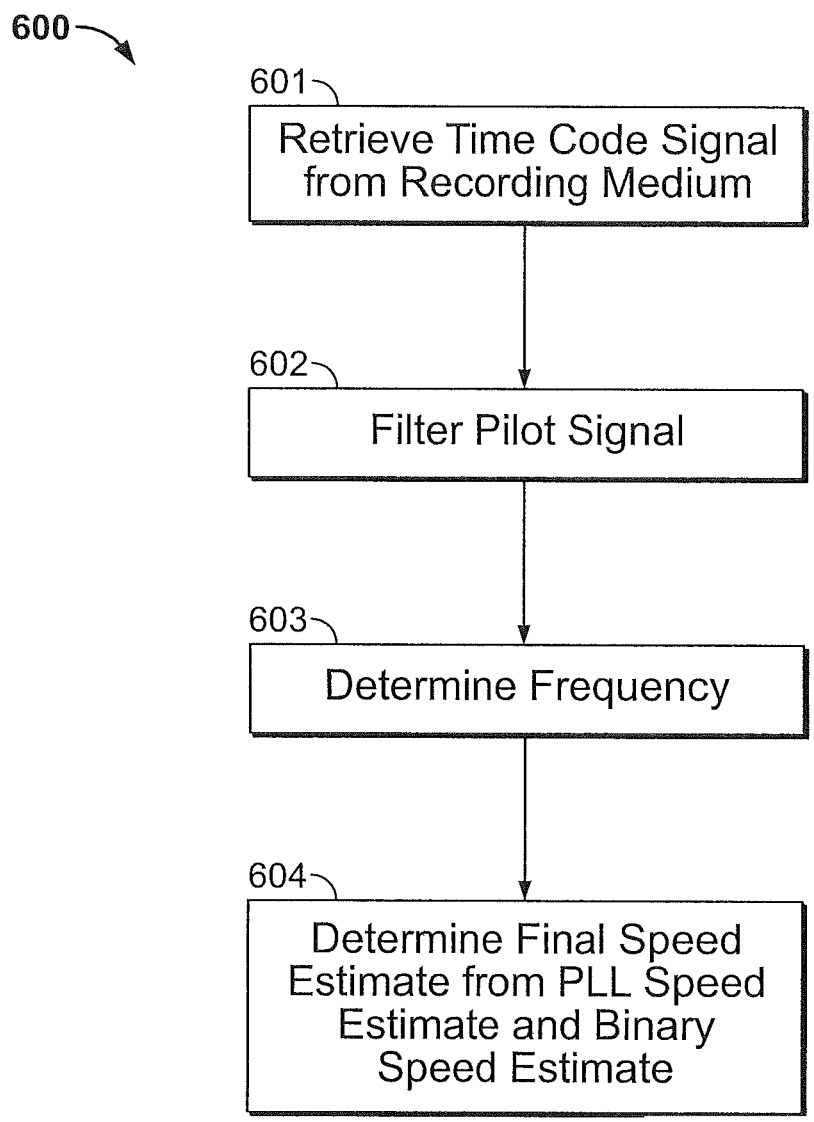
FIG. 6 is a flow diagram of a method for estimating speed of a recording medium, in accordance with one embodiment of the invention.

FIG. 6 is a flowchart summarizing an illustrative method 600 for estimating the speed of a recording medium having a time code signal circumferentially recorded thereon, using the decoder 125. In step 601, the time code signal may be retrieved from a recording medium, such as by a traditional pick-up for a vinyl record or by optical detection for a CD. The retrieved time code signal may be supplied to a HPF/LPF, such as the filter 400, which, in step 602, may provide a high pass filtered signal from which the pilot signal may be recovered. In step 603, the frequency of the recovered pilot signal may be determined, such as by the PLL unit. In step 604, a PLL speed estimate determined from the frequency, and also binary speed estimates determined based on the recovered binary signal, may be processed to determine a final speed estimate 408 of the recording medium.

Figure 7:
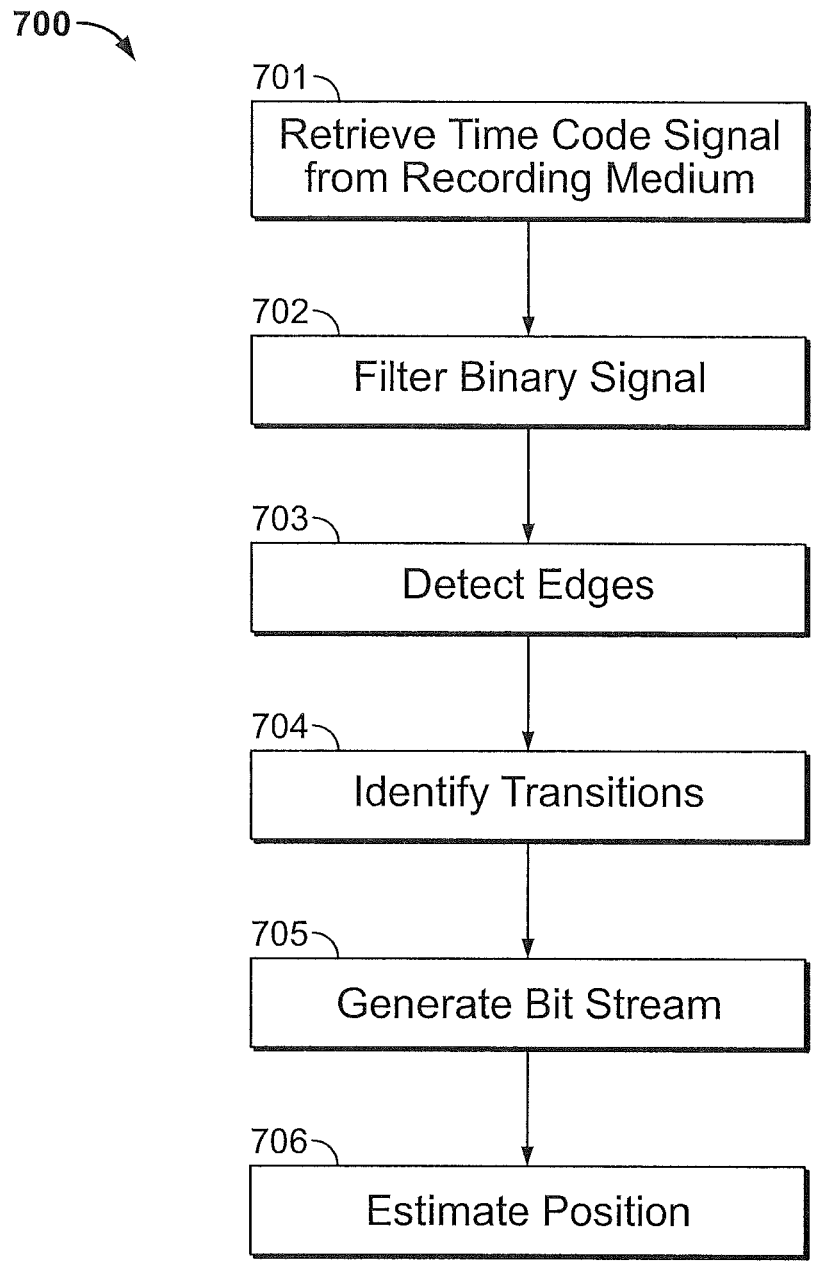
FIG. 7 is a flow diagram of a method for estimating position on a recording medium, in accordance with one embodiment of the invention.

FIG. 7 is a flowchart summarizing an illustrative method 700 for estimating a position on a recording medium from which a time code signal, which is circumferentially recorded thereon, is retrieved, using the decoder 125. In step 701, the time code signal may be retrieved from the recording medium and supplied to a HPF/LPF, such as the filter 400, similarly as described above for the method 600. In step 702, the filter 400 may provide a low pass filtered signal from which the binary signal may be recovered. In step 703, the edge detector 401 may process the low pass filtered signal from the filter 400 to detect transients in the binary signal. Next, in step 704, the transient sifter 402 may process the detected transients of the binary signals as determined by the detector 401 to identify transitions in a binary stream using the speed estimate 408, such as determined from the method 600, as a reference. In step 705, a bit stream may be generated by the BCR unit 403, which analyzes the transitions and uses the estimated speed 408 to determine the number of consecutive identical bits to insert into the bit stream. In step 706, a position on the recording medium may be estimated based on the bit stream generated in the previous step.

Although the invention herein has been described with reference to particular embodiments, it is to be understood that these embodiments are merely illustrative of the principles and applications of the invention. It is therefore to be understood that numerous modifications may be made to the illustrative embodiments and that other arrangements may be devised without departing from the spirit and scope of the invention as defined by the appended claims. Furthermore, while particular processes are shown in a specific order in the appended drawings, such processes are not limited to any particular order unless such order is expressly set forth herein.

The invention claimed is:

1. A method for signal processing for controlling a digital audio source comprising:
   retrieving a time code signal from a rotating recording medium, the time code signal being a sum of a binary signal and a sinusoidal pilot signal having a frequency in the audible range, the binary signal having a symbol frequency less than the frequency of the pilot signal;
   filtering the time code signal to recover the pilot signal and the binary signal; and
   providing estimated speed of rotation of the recording medium determined from a recovered pilot signal, and estimated position data determined from a recovered binary signal, for controlling the digital audio source.

2. The method of claim 1, wherein the frequency of the pilot signal and the symbol frequency of the binary signal are separated by a predetermined amount.

3. The method of claim 1, wherein the filtering includes using a low pass/high pass crossover filter having respective predetermined low pass and high pass cut off frequencies to generate a low pass output and high pass output, wherein in the low pass output the recovered pilot signal is attenuated a predetermined amount relative to the recovered binary signal and wherein in the high pass output the recovered binary signal is attenuated a predetermined amount relative to the recovered pilot signal.

4. The method of claim 3, wherein the predetermined cut off frequencies are scaled proportionally to the estimated speed of rotation.

5. The method of claim 1, wherein the recovered pilot signal is a sine wave of substantially constant amplitude.

6. The method of claim 1, wherein the estimated speed of rotation is used to determine the estimated position data.

7. The method of claim 1, wherein the estimated speed of rotation is used to reconstruct, from the recovered binary signal, a binary code represented by the binary signal.

8. The method of claim 7, wherein the estimated speed of rotation is used to estimate a number of repeated consecutive bits to insert into the binary code.

9. The method of claim 1, wherein a binary code indicative of a position on the recording medium is determined from the recovered binary signal using the estimated speed of rotation.

10. The method of claim 1, wherein the frequency of the pilot signal is between about 1.5-5.6 KHz and the symbol frequency of the binary signal is less than about 2.5 KHz.

11. The method of claim 10, wherein the ratio between the frequency of the pilot signal and the symbol frequency of the binary signal is at least approximately 1.5:1.

12. An apparatus for signal processing comprising:
a filtering unit to filter a time code signal retrieved from a rotating recording medium to recover a sinusoidal pilot signal and a binary signal summed in the time code signal, the pilot signal having a frequency in the audible range and the binary signal having a symbol frequency less than the frequency of the pilot signal; and
an estimating unit to determine an estimated speed of rotation of the recording medium from a recovered pilot signal, and estimated position data from a recovered binary signal.

13. The apparatus of claim 12 further comprising:
an output unit for providing the estimated speed of rotation and the estimated position data for controlling a digital audio source.

14. The apparatus of claim 12, wherein the frequency of the pilot signal and the symbol frequency of the binary signal are separated by a predetermined amount.

15. The apparatus of claim 12, wherein the filtering unit includes a low pass/high pass crossover filter having respective predetermined low pass and high pass cut off frequencies and is for generating a low pass output and high pass output.

16. The apparatus of claim 15, wherein the predetermined cut off frequencies are scaled proportionally to the estimated speed of rotation.

17. The apparatus of claim 12 further comprising:
an estimation unit to determine second estimated position data from the estimated speed of rotation.

18. The apparatus of claim 12 further comprising:
a binary code reconstruction unit to reconstruct, from the recovered binary signal, a binary code represented by the binary signal using the estimated speed of rotation.

19. The apparatus of claim 18, wherein the estimated speed of rotation is used to estimate a number of repeated consecutive bits to insert into the binary code.

20. The apparatus of claim 12, wherein the frequency of the pilot signal is between about 1.5-5.6 KHz and the symbol frequency of the binary signal is less than about 2.5 KHz.

21. A method for signal processing for controlling a digital audio source, comprising:
retrieving a time code signal from a rotating recording medium, the time code signal having a stereophonic binary signal, each channel of the stereophonic binary signal representing a same binary code and independently identifying an absolute position within the time code signal using a predetermined number N of consecutive bits; and
estimating an absolute position within the time code signal using a predetermined number M of consecutive bits identified from each channel of the stereophonic binary signal, wherein M is less than the N.

22. The method of claim 21 further comprising:
outputting an estimate of the absolute position within the time code signal to control a digital audio source.

23. The method of claim 21 further comprising:
recovering first and second binary signals from the time code signal;
reconstructing first and second binary codes respectively from the recovered first and second binary signals; and
determining the estimated absolute position within the time code signal using N/2 consecutive bits from each of the reconstructed first and second binary codes.

24. The method of claim 23, wherein the second binary signal is delayed relative to the first binary signal in the time code signal by a time interval corresponding to N/2 consecutive bits.

25. The method of claim 23, wherein N/2 consecutive bits of the first and second binary codes are concatenated into an N bit word.

26. The method of claim 21, wherein the time code signal includes a stereophonic sinusoidal pilot signal, and wherein the stereophonic sinusoidal pilot signal is recovered from the retrieved time code signal and used to estimate speed of rotation of the medium.

27. The method of claim 26, wherein the stereophonic sinusoidal pilot signal is combined with the stereophonic binary signal in the time code signal.

28. The method of claim 26, wherein the stereophonic sinusoidal pilot signal is summed with the stereophonic binary signal in the time code signal.

29. The method of claim 26, wherein the stereophonic sinusoidal pilot signal is modulated by the stereophonic binary signal in the time code signal.

* * * * *